Figure 2:
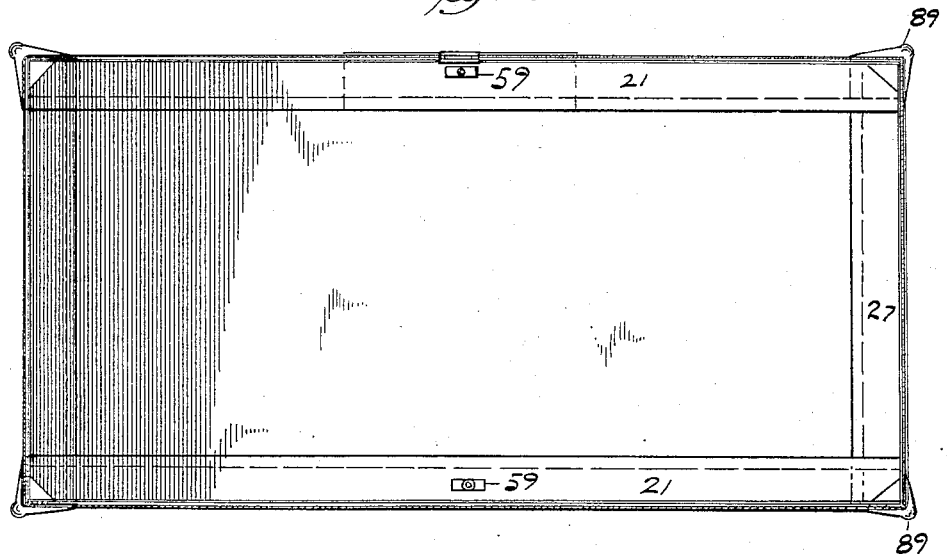

A. P. COCHRANE.
KNOCKDOWN CONTAINER.
APPLICATION FILED JUNE 21, 1913. RENEWED NOV. 26, 1915.

1,195,908.

Patented Aug. 22, 1916.
4 SHEETS—SHEET 1.

WITNESSES:
C. J. Larsen
Warren E. Willis

INVENTOR
Albert P. Cochrane
BY
F. V. Winter
ATTORNEY

A. P. COCHRANE.
KNOCKDOWN CONTAINER.
APPLICATION FILED JUNE 21, 1913. RENEWED NOV. 26, 1915.
1,195,908.
Patented Aug. 22, 1916.
4 SHEETS—SHEET 2.
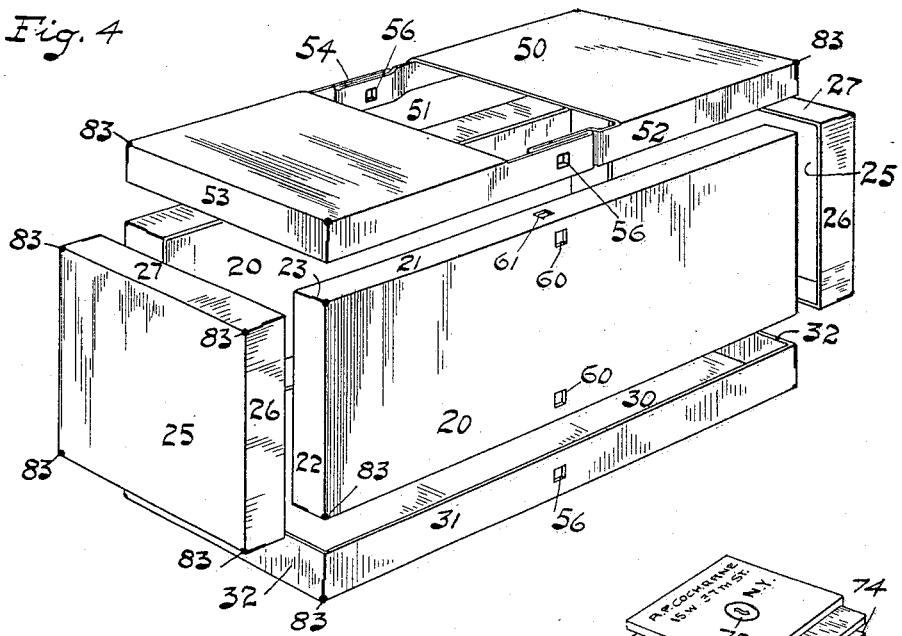
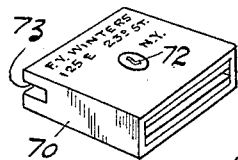
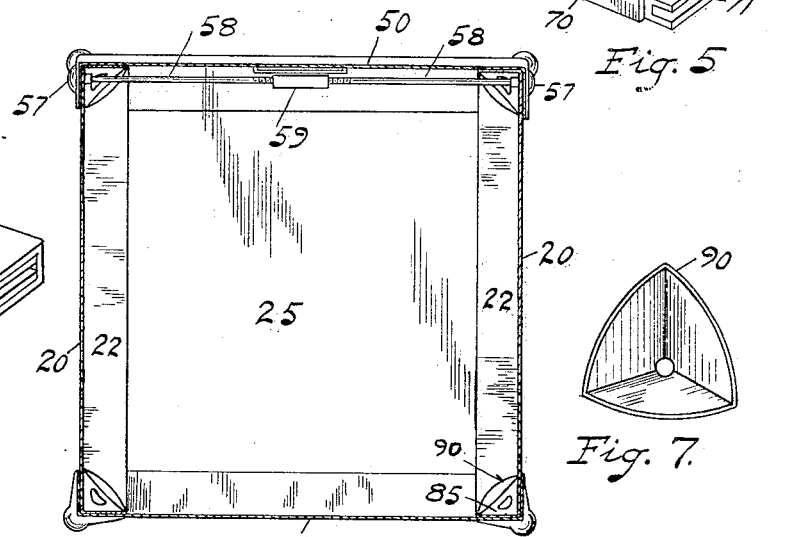
WITNESSES:
C. J. Larsen
Warren E. Willis
INVENTOR.
Albert. P. Cochrane.
BY
F. V. Winters
ATTORNEY A. P. COCHRANE.
KNOCKDOWN CONTAINER.
APPLICATION FILED JUNE 21, 1913. RENEWED NOV. 26, 1915.
1,195,908.
Patented Aug. 22, 1916.
4 SHEETS—SHEET 3.
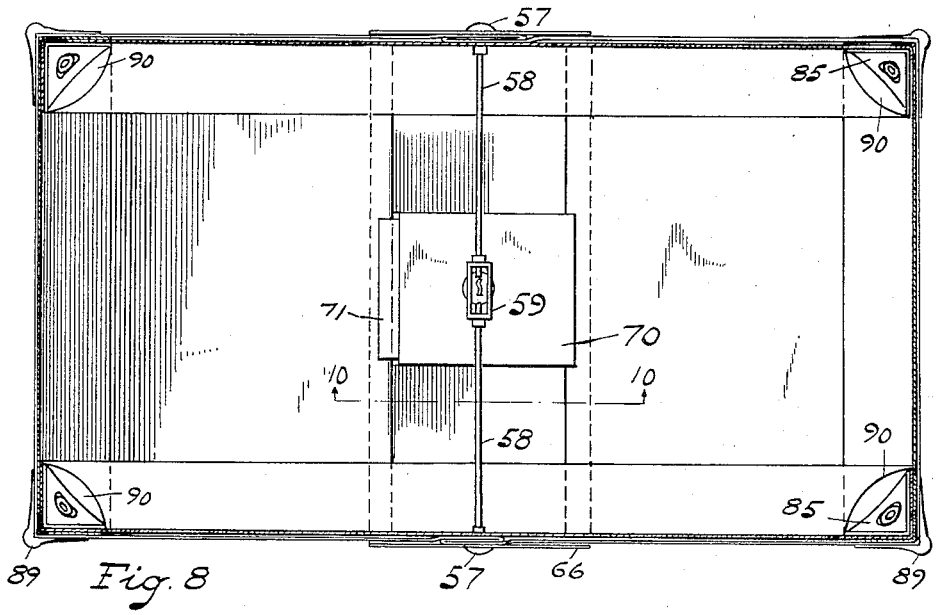
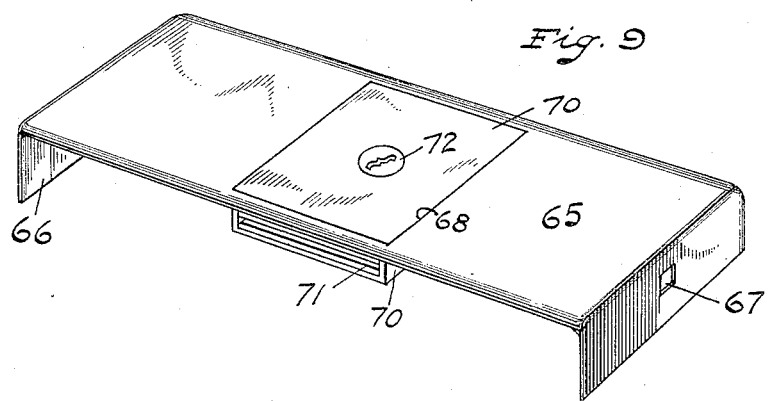
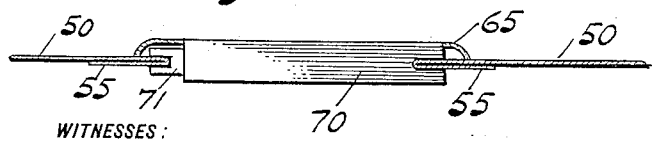
WITNESSES:
C. J. Larsen
Warren E. Willis
INVENTOR
Albert P. Cochrane
BY
F. V. Wintur
ATTORNEY A. P. COCHRANE.
KNOCKDOWN CONTAINER.
APPLICATION FILED JUNE 21, 1913. RENEWED NOV. 26, 1915.
1,195,908.
Patented Aug. 22, 1916.
4 SHEETS—SHEET 4.
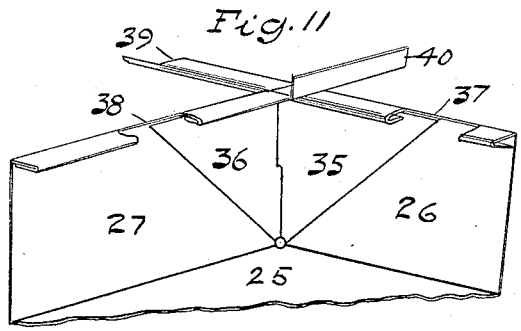
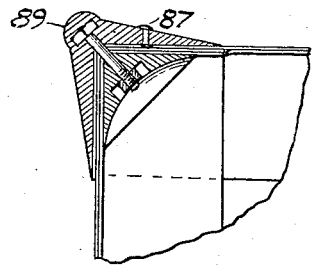
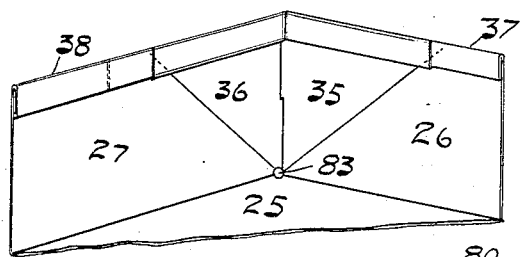
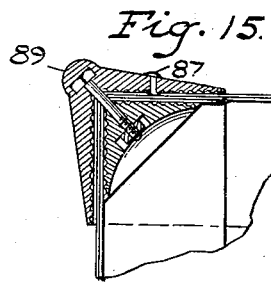
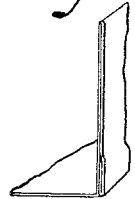
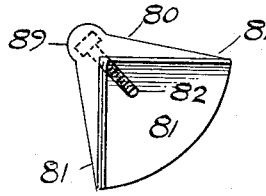
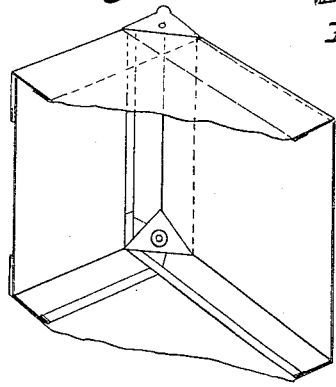
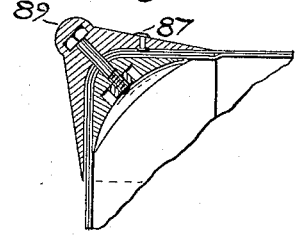
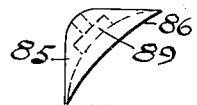
WITNESSES:
C. J. Larsen
Warren E. Willis
INVENTOR
Albert P. Cochrane
BY
F. V. Winters
ATTORNEY

UNITED STATES PATENT OFFICE.

ALBERT P. COCHRANE, OF NEW YORK, N. Y., ASSIGNOR TO JANE HARTLEY COCHRANE, OF NEW YORK, N. Y.

KNOCKDOWN CONTAINER. REISSUED.

1,195,908. Specification of Letters Patent. Patented Aug. 22, 1916.

Application filed June 21, 1913, Serial No. 774,981. Renewed November 26, 1915. Serial No. 63,676.

*To all whom it may concern:*

Be it known that I, ALBERT P. COCHRANE, a citizen of the United States, and a resident of the city of New York, in the county of New York and State of New York, have invented certain new and useful Improvements in Knockdown Containers, of which the following is a specification.

This invention relates to improvements in knock-down containers and particularly to packing cases adapted to be used in the transportation of merchandise and returned in a "knocked down" condition.

The objects of the invention are, to provide receptacles capable of containing goods to which they may be adapted, secure from loss and injury during transportation of merchandise and storage, which, after use, may be taken apart or separated into distinct elements susceptible of being packed into a small compass for return to the shipper.

A second object is to provide means combined with such receptacles whereby they are held securely in an open or receptive position when so desired and are further provided with devices which obviate the use of skids or rollers in moving from place to place when filled or loaded with goods.

A third object is to combine with the retainer a locking device also operative as a reversible metallic tag which may have inscribed permanently on its opposite sides the addresses of the consignor and consignee respectively, thereby assuring safety to the goods and a correct destination of the retainer.

Figure 1:
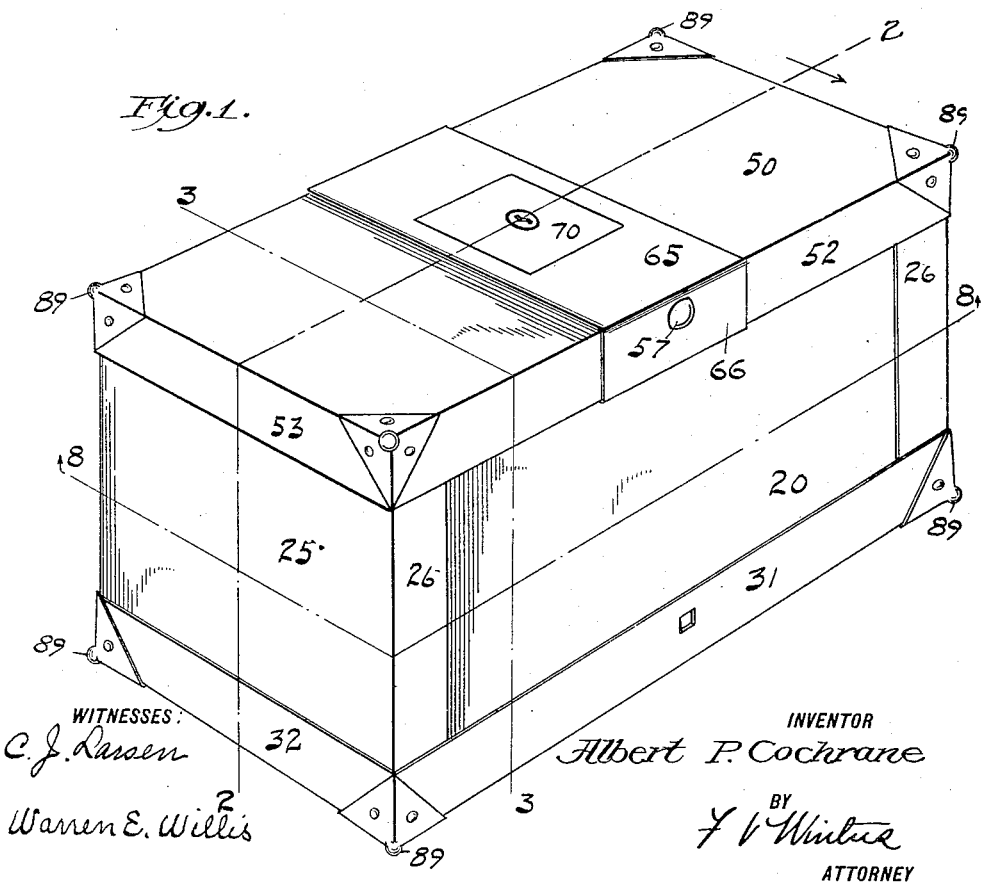

These and other allied objects are attained by the novel construction and arrangement of parts hereinafter described and shown in the accompanying drawings, forming part of this specification, and in which:

Figure 1 is a perspective view of a container made in accordance with the invention. Fig. 2 is a longitudinal section of the same taken on line 2—2 of Fig. 1. Fig. 3 is a cross section of the same taken on line 3—3 of Fig. 1. Fig. 4 is a perspective view of the several parts in detail showing the assemblage relation. Fig. 5 is a perspective view of the locking tag showing the bolt extended. Fig. 6 is a similar view of the same showing the bolt retracted, and the tag reversed. Fig. 7 is a perspective view of an interior corner piece in detail. Fig. 8 is a sectional view looking upward on line 8—8 of Fig. 1. Fig. 9 is a perspective view of a removable cover plate including the lock-tag. Fig. 10 is a fragmentary sectional view taken on line 10—10 of Fig. 8. Fig. 11 is a perspective view showing a partially completed corner construction. Fig. 12 is a similar view showing the same completely formed. Fig. 13 is a perspective view showing an upper and lower corner as completely formed with its attachments. Fig. 14 is a sectional view taken diagonally through a corner showing one form of construction. Fig. 15 is a similar view showing a slightly modified construction. Fig. 16 is another like view further modified. Fig. 17 is a plan view of the interior corner element indicated in Fig. 16. Fig. 18 is a plan view of the exterior corner element, and, Fig. 19 is a fragmentary perspective view showing a reinforced construction of cover plates.

The invention comprises a pair of side plates 20 made of any suitable material, as sheet metal, fiber or the like having flanges 21 along the sides and similar flanges 22 at the ends, the same being cut in such manner as to interengage at the corners 23 forming in effect shallow rectangular boxes; the end members 25 are formed in like manner with end and side flanges 26 and 27 respectively and so proportioned as to receive the ends of the side members within the box-like structure presented. It may be stated here that the invention comprehends a reversal of these positions, that is to say, in some shapes of containers, it may be considered desirable to insert the end members within the side members in place of the foregoing method of assemblage. Either method provides a relatively rigid four-sided structure open at the top and bottom, easily assembled or dismounted; to this is applied a bottom plate 30 shaped to the requisite size and having its edges 31 and 32 flanged and each corner interengaged as indicated particularly in Figs. 11 and 12. These side, end and bottom plates are formed from rectangular blanks sheared and folded without any waste of material whatever, in such manner as to form triangular reinforcements 35 and 36 extending perpendicularly from the edges 37 and 38 which are doubly folded to produce a smooth and strong structure; the process of construction is shown in Fig. 11, where it will be seen that the extending arm portions 39 and 40 are turned angularly and interengaged within the folds of the adjacent edge corners, the completed structure appearing in Fig. 12. The top covers 50 are formed in the same manner regarding the corners and edges and are further provided with an opening 51 extending laterally across from side to side within the flanged portions midway of the plate; these flanged sides 52 on the top cover are reinforced by seaming in such manner as to produce three thicknesses of material along the center portion 54 of the same, the opening 51 being made sufficiently wide to permit of the metal being so disposed and a further allowance is provided to allow the edges of the opening to be doubled as shown at 55 in Fig. 10.

Suitable openings 56 are made through the flanges 31 and 52 to receive the square shanks of bolts having heads 57 and stems 58 screw threaded at their inner ends, the same being adapted to engage with the turnbuckle 59 so that the bolts may be stressed holding the sides rigidly in their proper positions at both top and bottom. Other openings 60 are provided in the side plates 20 to properly register with the mentioned openings 56 and still other openings 61 are formed through the flanges 21 through which the bolts are passed when the structure is dismantled and the side elements nested in the cover members. Covering over the opening 51 is a plate 65 having its ends 66 turned down and fitted over the cover sides 52 so that the opening 56 registers with the opening 67 to receive the bolt 58. In the center of the plate 65 is a rectangular opening 68 adapted to receive the body 70 of a reversible lock having a wide bolt or slidable member 71 operated by a key through the escutcheon 72. This lock is further provided with a groove 73 formed longitudinally across the end of the body member 70, a similar groove 74 also being formed in the end of the bolt 71; these grooves are adapted to engage with the folded edges 55 of the opening in the upper cover plate 50 and at the same time the body 70 extends upward into the opening formed in the removable plate 65. Thus it will be seen that all openings are fully covered and secured, and that by releasing the lock it can be removed so as to obtain access to the turnbuckle 59 in adjusting the same and furthermore as the lock body is adapted to bear an address on each side, it being reversible, that a correct, and permanent address is had both of the consignor and consignee; this lock-tag is shown in detail in Figs. 5 and 6. Over each corner on the outside is attached a metal member 80 having three angular projections 81 adapted to engage with two sides and the upper or lower surface adjacent. These members contain the head of a short bolt 82 which extends diagonally from the inner corner of apex and is adapted to pass through appropriate openings 83 formed in the extreme corners of the structure and also through an inner metal member 85 having three angular faces presented to the interior corner; this inner member is formed preferably with a concave face 86 having a central annular recess 89 adapted to receive a nut fitting the mentioned bolt with sufficient space to operate a wrench in adjusting the same. This construction is clearly indicated in Fig. 14 while in Fig. 15 a modified form of metal corners is presented having on their respective engaging surfaces a series of sharp projections or serrations adapted to engage with the material used in the construction. Another modification is presented in Fig. 16, in which the plate ends are curved thus avoiding sharp cornered construction; in all these the same arrangement of securing a bolt is used and with any of them may be used a liner or washer 90 formed from a circular disk, as shown in Fig. 7, of any desired material preferably of an elastic or yielding nature so that it may readily conform to the interior corners even if somewhat irregular. As a further means of attaching these corner members, rivets 87 may be used, the same passing through and solidly uniting the several parts of the covers to said corner members. Surrounding the heads of the bolts 82 is a knob of metal 89 the same extending diagonally outward beyond the structure so that the same rests upon these knobs in whatever position the structure may be placed and acting in the manner of casters thereby facilitating moving the receptacle. Although the described construction provides an exceptionally strong receptable, it may be rendered even more rigid by forming the flanges of the top and bottom members as is indicated in Fig. 19 where the material is folded over and again seamed where the edge adjoins the plate portion.

The operation of assembling the container is thought to be evident from the foregoing description, the filling or loading being done through the opening normally covered by the plate 65; after which the mentioned plate is placed in position, the turn-buckle rods or bolts put in place, the former being operated through the opening or hand hole in which is eventually placed the lock-tag 70; after this has been secured it is not possible to obtain access unauthorizedly to the interior.

In dismounting the retainer, the lock-tag is first removed, after which the turn-buckle, bolt, and corner members are taken off, so as to take off the cover plate 65 and withdraw the contents; when empty the side members are removed from the ends and placed telescopically edge up within the top and bottom members respectively, while disposed between are the end members; these are secured in position by inserting the mentioned bolts, through the openings 56 and 61 and applying the turn-buckles.

Obviously minor changes may be made from the exact construction indicated without departing from the general scope of the invention.

Having thus described my invention, what I claim as new and desire to secure by Letters Patent, is:

1. A container comprising separable wall sections each having an inturned flange extending around the same and provided with openings at the corners adapted to aline with one another when the sections are set up, and fastening means passed through said alined openings.

2. In a container of the class described, the combination with separable wall sections, of a top section having an opening therein, means accessible through said opening for locking the wall and top sections together, and means to close said opening including a lock having a groove in its edge opposite its bolt for engaging one edge of said opening, said bolt adapted to engage below the opposite edge of said opening.

3. In a container of the class described, the combination with separable wall sections, of a top section having an opening therein, means accessible through said opening for locking the wall and top sections together, and means to close said opening including a reversible lock having a groove in its edge opposite its bolt for engaging one edge of said opening, said bolt also having a groove in its end to engage the opposite edge of said opening, whereby said lock may be applied with either side out for the purpose specified.

4. In a container of the class described, the combination with separable wall sections, of a top section having an opening extending across the same, a separate cover section to close the opening in the top section and having an opening therein, means accessible through the opening in the top section when the cover section is removed for securing the wall sections together, means accessible through the opening in the cover section when the same is in place for securing said cover section to the wall sections, and a lock adapted to fill the opening in the cover section and prevent access to said latter securing means.

5. In a container of the class described, the combination with separable base, side, end and top sections each having a right-angularly turned flange extending around its margin, the base and top sections being of a size to fit over the other sections after the end sections have been slipped over the ends of the side sections in erecting the container, of means for fastening said sections together.

In testimony whereof I have signed my name to this specification in the presence of two subscribing witnesses.

ALBERT P. COCHRANE.

Witnesses:
  PIERRE M. CLEAR,
  WARREN E. WILLIS.